United States Patent
Bookstein (10) Patent No.: US 12,393,407 B2
(45) Date of Patent: *Aug. 19, 2025

(54) MATCHING BINARY CODE TO INTERMEDIATE REPRESENTATION CODE

(71) Applicant: Next Silicon Ltd, Givatayim (IL)

(72) Inventor: Itay Bookstein, Tel Aviv (IL)

(73) Assignee: Next Silicon Ltd, Givatayim (IL)

( * ) Notice: Subject to any disclaimer, the term of this patent is extended or adjusted under 35 U.S.C. 154(b) by 33 days.

This patent is subject to a terminal disclaimer.

(21) Appl. No.: 18/424,954

(22) Filed: Jan. 29, 2024

(65) Prior Publication Data

US 2024/0168736 A1     May 23, 2024

Related U.S. Application Data (63) Continuation of application No. 17/588,430, filed on Jan. 31, 2022, now Pat. No. 11,886,847.

(51) Int. Cl.
    *G06F 8/41*       (2018.01)
    *G06F 8/54*       (2018.01)

(52) U.S. Cl.
    CPC ............ *G06F 8/443* (2013.01); *G06F 8/54* (2013.01)

(58) Field of Classification Search
    CPC .................................. G06F 8/443; G06F 8/51
    USPC .................................................. 717/130–151
    See application file for complete search history.

(56) References Cited

U.S. PATENT DOCUMENTS

| | | | |
|---|---|---|---|
| 5,930,509 A | 7/1999 | Yates et al. | |
| 5,966,541 A | 10/1999 | Agarwal | |
| 6,226,789 B1 | 5/2001 | Tye et al. | |
| 6,263,491 B1 | 7/2001 | Hunt | |
| 6,289,505 B1 | 9/2001 | Goebel | |
| 6,314,558 B1 * | 11/2001 | Angel | G06F 11/3636 717/130 |
| 6,381,735 B1 | 4/2002 | Hunt | |
| 6,499,137 B1 | 12/2002 | Hunt | |
| 6,622,300 B1 * | 9/2003 | Krishnaswamy | G06F 9/45525 717/130 |

(Continued)

FOREIGN PATENT DOCUMENTS

WO      WO 2017/205118       11/2017

OTHER PUBLICATIONS

Anand et al, "A Compiler-level Intermediate Representation based Binary Analysis and Rewriting System", ACM, pp. 1-14 (Year: 2013).*

(Continued)

*Primary Examiner* — Anil Khatri (57) ABSTRACT

A system for generating executable code of a software program that is matched with an intermediate representation (IR) of a source code of the software program. The system comprises a processor adapted for adding one or more annotation entries, each for a location in the IR, to program data in the IR. An internal annotation entry is generated for an internal location in the IR that is not referenced by an IR symbol in the global IR symbol table of the IR. The processor is further adapted for compiling the IR to produce a binary object comprising the annotation entries, and providing the binary object to a linker or to a dynamic loader to update in an executable object an executable internal annotation entry associated with an internal annotation entry to reference run-time location in the executable object.

21 Claims, 4 Drawing Sheets

(56) References Cited

U.S. PATENT DOCUMENTS

| | | | |
|---|---|---|---|
| 6,820,258 B1* | 11/2004 | Fink | G06F 8/443 |
| | | | 717/158 |
| 6,874,140 B1* | 3/2005 | Shupak | G06F 11/3644 |
| | | | 717/146 |
| 6,957,422 B2 | 10/2005 | Hunt | |
| 6,973,646 B1 | 12/2005 | Bordawekar et al. | |
| 7,013,469 B2 | 3/2006 | Smith et al. | |
| 7,240,342 B1 | 7/2007 | Bharadwaj et al. | |
| 7,316,010 B1 | 1/2008 | Daynes et al. | |
| 7,730,459 B2 | 6/2010 | Gates et al. | |
| 7,757,221 B2 | 7/2010 | Zheng et al. | |
| 8,645,934 B2 | 2/2014 | Fontenot et al. | |
| 8,789,032 B1* | 7/2014 | Li | G06F 8/30 |
| | | | 717/154 |
| 8,959,477 B2* | 2/2015 | Mueller | G06F 8/30 |
| | | | 717/136 |
| 9,117,071 B2* | 8/2015 | Beretta | G06F 21/54 |
| 9,223,554 B1 | 12/2015 | Lawson | |
| 9,430,200 B1 | 8/2016 | Trofin et al. | |
| 9,477,461 B1 | 10/2016 | Korotaev | |
| 10,019,244 B1* | 7/2018 | Rocamora | G06F 9/45508 |
| 10,203,968 B1 | 2/2019 | Lawson | |
| 10,346,287 B1 | 7/2019 | Dillon | |
| 10,713,024 B2 | 7/2020 | Jaeger et al. | |
| 11,061,653 B2* | 7/2021 | Fang | G06F 9/30058 |
| 11,550,903 B1 | 1/2023 | Epstein | |
| 11,822,908 B1* | 11/2023 | Hatti | G06F 8/423 |
| 2005/0235269 A1 | 10/2005 | K N et al. | |
| 2019/0114401 A1 | 4/2019 | De et al. | |
| 2023/0244457 A1 | 8/2023 | Bookstein | |

OTHER PUBLICATIONS

Krichner et al, "bin2llvm: Analysis of Binary Programs Using LLVM Intermediate Representation", ACM, pp. 1-7 (Year: 2017).*

Mennie et al, "Information Flow Certification Using an Intermediate Code Program Representation", IEEE, pp. 1-14 (Year: 1981).*

Whaley, "Partial Method Compilation using Dynamic Profile Information", ACM, pp. 1-14 (Year: 2001).*

Communication Pursuant to Article 94(3) EPC Dated Jul. 5, 2024 From the European Patent Office Re. Application No. 23154283.8. (5 Pages).

Communication Pursuant to Article 94(3) EPC Dated Mar. 25, 2025 From the European Patent Office Re. Application No. 23154283.8 (7 Pages).

Interview Summary Dated Aug. 8, 2023 from the US Patent and Trademark Office Re. U.S. Appl. No. 17/588,430. (2 pages).

Notice of Allowance Dated Sep. 25, 2023 together with Interview Summary from the US Patent and Trademark Office Re. U.S. Appl. No. 17/588,430. (9 pages).

Official Action Dated Jun. 9, 2023 from the US Patent and Trademark Office Re. U.S. Appl. No. 17/588,430. (14 pages).

Official Action Dated Jan. 23, 2023 from the US Patent and Trademark Office Re. U.S. Appl. No. 17/588,430. (22 pages).

Supplementary European Search Report and the European Search Opinion Dated Jun. 20, 2023 From the European Patent Office Re. Application No. 23154283.8. (10 Pages).

Anand et al. "A Compiler-Level Intermediate Representation Based Binary Analysis and Rewriting System", ACM Digital Library, 295-308, Apr. 15, 2013.

Brandolese et al. "Software Energy Estimation Based on Statistical Characterization of Intermediate Compilation Code", IEEE/ACM International Symposium on Low Power Electronics and Design, 333-338, 2011.

Cesare et al. "Wire—A Formal Intermediate Language for Binary Analysis", IEEE International Conference on Trust, Security and Privacy in Computing and Communications, 515-524, 2012.

Gong et al. "Iterative Quantization: A Procrustean Approach to Lerning Binary Codes for Large-Scale Image Retrieval", IEEE Transactions on Pattern Analysis and Machine Intelligence, 35(12): 2916-2929, Dec. 2013.

Mao et al. "Cross-Language Binary-Source Code Matching Based on Rust and Intermediate Representation", IEEE the 3rd International Conference on Computer Communication and Artificial Intelligence, 195-199, 2023.

Sæbjørnsen et al. "Detecting Code Clones in Binary Executables", ISSTA '09: Proceedings of the eighteenth international symposium on Software testing and analysis, 177-128, Jul. 19, 2009.

* cited by examiner

301
Add one or more annotation entries to program data in an IR of a source code

305
Insert a plurality of telemetry instructions

310
Compile the IR to produce a binary software object

320
Provide the binary software object to a linker and/or a dynamic loader to update one or more executable internal annotation entries

330
Collect a plurality of statistical values

340
Provide the IR and the binary executable software object to one or more management software objects

341
Provide the plurality of statistical values to the one or more management software objects

MATCHING BINARY CODE TO INTERMEDIATE REPRESENTATION CODE

RELATED APPLICATION

This application is a Continuation of U.S. patent application Ser. No. 17/588,430 filed on Jan. 31, 2022. The contents of the above applications are all incorporated by reference as if fully set forth herein in their entirety.

FIELD AND BACKGROUND OF THE INVENTION

Some embodiments described in the present disclosure relate to generating executable code and, more specifically, but not exclusively, to matching binary executable code to intermediate representation code.

In the field of computer programming, the term "compilation" refers to a process of generating machine code from a source code of a software program. A product of a compiler is usually referred to as "object code", and is typically independent of its location in computer memory when the software program is executed. In addition, in the field of computer programming the term "linking" refers to combining one or more object code files into a single executable software object. In addition, in the field of computer programming the term "loading" refers to copying machine executable code into computer memory. As object code is typically independent of its location in computer memory, object code typically comprises placeholders for run-time locations in the executable software object. A placeholder may be an absolute location. A placeholder may be an offset from an identified base location. The term "address resolving", in the field of computer programming, refers to translating a placeholder in object code into a location in the executable software object.

As used herewithin, the term "binary software object" is used to mean an object code object, produced by compiling at least part of a software program's source code, and the term "binary executable software object" is used to mean a binary object which may be executed by a hardware processor, usually produced by linking one or more binary software objects. Some examples of a binary executable software object are a binary executable file, a static library and a dynamically loaded library (DLL).

For brevity, henceforth the term "executable object" is used to mean "binary executable software object" and the terms are used interchangeably. In addition, for brevity henceforth the term "binary object" is used to mean "binary software object" and the terms are used interchangeably.

In the process of generating executable code from a source code of a software program, it is common practice to translate the source code into an intermediate representation (IR) that is independent of a source programming language of the software program. Additionally, or alternatively, the IR is independent of a target machine language. Some methods of generating executable code use more than one IR, each IR having some degree of independence from the source programming language and additionally or alternatively some degree of independence from a target machine language.

As used herewithin, unless otherwise noted the term "IR" is used to mean "IR code" and the terms are used interchangeably. It should be noted that an IR of a software program's source code may comprise a plurality of IR files, each for one of a plurality of binary objects used to produce an executable object of the software program.

Generation of executable code from a source code typically comprises analysis of the source code and synthesis of the executable code. An IR allows using an analysis of the source code in order to synthesize more than one executable code, each for one of a plurality of target machines, making the software program more portable across a variety of target machines. A common use of IR code is for machine independent optimization of the software program. Using an IR allows using an outcome of optimizing the software program for a plurality of target machines.

A symbol table is a data structure that stores information about occurrences of various entities in a software program, comprising for each entity an identifier and a corresponding address or offset. Some examples of an entity of a software program include, but are not limited to, a variable identifier, a function identifier, a label identifier, a function argument identifier and an instruction identifier.

When producing an IR one or more IR symbols may be generated, each referencing an entity of the software program in the IR (IR entity). A global IR symbol table is a data structure that stores information about one or more IR entities whose location is shared among one or more binary objects used to produce an executable object. It should be noted that a global IR symbol table may not store information about all IR symbols generated when producing the IR. An IR symbol of one binary object that is not shared with another binary object may not be described by the global IR symbol table. As a result, not all entities of the software program are referenced by the global IR symbol table. In addition to the examples of entities of a software program mentioned above, another example of an internal IR entity is a basic block. A basic block is a sequence of code with no branches except to enter and exit the basic block. It is common practice for compilers to decompose a software program into its basic blocks, and thus an IR may comprise a plurality of basic blocks. However, these basic blocks are entities internal to the IR and are usually not represented in the global IR symbol table.

SUMMARY OF THE INVENTION

It is an object of some embodiments of the present disclosure to describe a system and a method for generating executable code of a software program where the executable code is matched with IR code of a source code of the software program, i.e. one or more internal locations in an executable object of the software program that are not referenced by a global symbol table thereof are matched with one or more locations in the IR code. In some embodiments described herewithin, one or more annotation entries are added to program data in the IR, where each annotation entry is for one of one or more locations in the IR, where at least one internal annotation entry of the one or more annotation entries is generated for an internal location in the IR that is not referenced by an IR symbol in a global IR symbol table of the IR. Further in such embodiments, a binary object produced from the IR comprises the one or more annotation entries and when the binary object is provided to a linker, one or more executable internal annotation entries are updated to reference a run-time location in the executable object. Additionally, or alternatively, the one or more executable internal annotation entries are updated when loading the executable object. Adding an internal annotation entry to program data in the IR allows propagating to the executable object a reference to an internal location in the IR that is not referenced in the global IR symbol table and propagated to the executable object from the global IR table.

The foregoing and other objects are achieved by the features of the independent claims. Further implementation forms are apparent from the dependent claims, the description and the figures.

According to a first aspect, a system for generating executable code comprises at least one hardware processor adapted for: to program data in an intermediate representation (IR) of a source code of a software program, the IR representing the source code independent of a source programming language and additionally or alternatively independent of a target machine language and comprising a global IR symbol table comprising at least some of one or more IR symbols generated when producing the IR, each IR symbol referencing a location in the IR, adding one or more annotation entries, each for one of one or more locations in the IR, wherein at least one internal annotation entry of the one or more annotation entries is generated for an internal location in the IR that is not referenced by an IR symbol in the global IR symbol table; compiling the IR to produce a binary software object comprising binary program data, where the binary program data comprises the one or more annotation entries; and providing the binary software object to a linker and additionally or alternatively to a dynamic loader to update one or more executable internal annotation entries in a binary executable software object generated using the binary software object, each for one of the at least one internal annotation entries, to reference a run-time location in the binary executable software object where the run-time location is associated with the internal location in the IR of the at least one internal annotation entry.

According to a second aspect, a method for generating executable code comprises: to program data in an intermediate representation (IR) of a source code of a software program, the IR representing the source code independent of a source programming language and additionally or alternatively independent of a target machine language and comprising a global IR symbol table comprising at least some of one or more IR symbols generated when producing the IR, each IR symbol referencing a location in the IR, adding one or more annotation entries, each for one of one or more locations in the IR, wherein at least one internal annotation entry of the one or more annotation entries is generated for an internal location in the IR that is not referenced by an IR symbol in the global IR symbol table; compiling the IR to produce a binary software object comprising binary program data, where the binary program data comprises the one or more annotation entries; and providing the binary software object to a linker and additionally or alternatively to a dynamic loader to update one or more executable internal annotation entries in a binary executable software object generated using the binary software object, each for one of the at least one internal annotation entries, to reference a run-time location in the binary executable software object where the run-time location is associated with the internal location in the IR of the at least one internal annotation entry.

According to a third aspect, a system for executing a software program comprises at least one hardware processor adapted for: accessing a binary executable software object produced by: to program data in an intermediate representation (IR) of a source code of a software program, the IR representing the source code independent of a source programming language and additionally or alternatively independent of a target machine language and comprising a global IR symbol table comprising at least some of one or more IR symbols generated when producing the IR, each IR symbol referencing a location in the IR, adding one or more annotation entries, each for one of one or more locations in the IR, wherein at least one internal annotation entry of the one or more annotation entries is generated for an internal location in the IR that is not referenced by an IR symbol in the global IR symbol table; compiling the IR to produce a binary software object comprising binary program data, where the binary program data comprises the one or more annotation entries; and providing the binary software object to a linker and additionally or alternatively to a dynamic loader to update one or more executable internal annotation entries in a binary executable software object generated using the binary software object, each for one of the at least one internal annotation entries, to reference a run-time location in the binary executable software object where the run-time location is associated with the internal location in the IR of the at least one internal annotation entry; and executing at least part of the binary executable software object.

With reference to the first and second aspects, in a first possible implementation of the first and second aspects the internal location in the IR is a location in the IR of an IR entity selected from the group of IR entities consisting of: a function identifier, a variable identifier, a function argument identifier, an instruction identifier, and a label identifier. Optionally, the IR further comprises a plurality of basic-blocks, each associated with one of a plurality of execution blocks of the software program, and the label identifier identifies one of the plurality of basic-blocks. Adding to the program data one or more references to one or more of the above group of IR entities and additionally or alternatively to a basic-block of the IR allows propagating to the executable object a reference to an internal IR location that otherwise is not propagated via the global IR table, increasing accuracy of an association between the IR and the updated binary executable software object. Optionally, at least one of the at least one internal annotation entries comprises at least one of: an internal IR symbol of the one or more IR symbols that is not in the global IR symbol table, an identified instruction operation code, an identified value in an instruction, and a reference to a program counter. Using an internal IR symbol allows propagating to the binary executable object a reference to an internal IR location. Using an identified instruction operation code and additionally or alternatively using an identified value in an instruction allows propagating to the binary executable object an identifier of an identified instruction that comprises the identified instruction operation code and additionally or alternatively the identified value, allowing an association between execution of the identified instruction and a corresponding intermediate instruction in the IR Similarly, using a reference to a program counter allows associating an instruction that is executed and another corresponding intermediate instruction in the IR.

With reference to the first and second aspects, in a second possible implementation of the first and second aspects at least one of the one or more executable internal annotation entries is updated in the binary executable software object when linking the binary software object to produce the binary executable software object. Updating the one or more executable internal annotations when linking the binary object allows associating an internal IR location that is referenced across a plurality of modules of the software program with a corresponding run-time location, increasing accuracy of an association between the IR and the updated binary executable software object. Optionally, the at least one hardware processor is further configured for providing the binary executable software object to at least one other hardware processor executing the dynamic loader, and at least one of the one or more executable internal annotation entries is updated in the binary executable software object when the dynamic loader configures the at least one other hardware processor to execute the binary executable software object. Updating the one or more executable internal annotations when dynamically uploading the binary executable software object allows associating an internal IR location that references a location outside the binary executable software object with another corresponding run-time location, increasing accuracy of an association between the IR and the updated binary executable software object. Optionally, the at least one other hardware processor is the at least one hardware processor, allowing the at least one hardware processor to compile and execute the software program.

With reference to the first and second aspects, in a third possible implementation of the first and second aspects the at least one hardware processor is further adapted for providing the IR comprising the one or more annotation entries and the binary executable software object comprising the updated one or more internal annotation entries to at least one management software object for the purpose of performing at least one management task. Performing the one or more management tasks using an IR comprising the one or more annotation entries and the executable object comprising the updated one or more internal annotation entries increases accuracy of an outcome of performing the one or more management tasks compared to performing the management tasks without both the IR comprising the one or more annotation entries and the binary executable software object comprising the updated one or more internal annotation entries. Optionally, the at least one hardware processor is further adapted for: collecting a plurality of statistical values while executing at least part of the binary executable software object, and further providing the plurality of statistical values to the at least one management software object. Optionally, the at least one management task comprises performing an analysis of the plurality of statistical values. Using a plurality of statistical values increases accuracy of an outcome of performing the one or more management tasks. Using the IR comprising the one or more annotation entries and the binary executable software object comprising the updated one or more internal annotation entries increases accuracy increases accuracy of associating at least some of the plurality of statistical values with at least some instructions of the binary executable software object, further increasing accuracy of the outcome of performing the one or more management tasks. Optionally, at least one of the plurality of statistical values is indicative of one of: an outcome of executing a control-flow instruction, a data value of a variable of the software program, a memory access pattern, and a memory virtual address translation. Optionally, the IR comprises a plurality of intermediate computer instructions. Optionally, the at least one hardware processor is further adapted for inserting a plurality of telemetry intermediate computer instructions into the plurality of intermediate computer instructions, for the purpose of collecting the plurality of statistical values.

With reference to the first and second aspects, or the third implementation of the first and second aspects, in a fourth possible implementation of the first and second aspects the IR comprises a plurality of intermediate computer instructions. Optionally, the at least one management task further comprises: optimizing the plurality of intermediate computer instructions based on the analysis of the plurality of statistical values and the one or more updated executable internal annotation entries, to produce a new IR of the source code, comprising a new plurality of intermediate computer instructions; producing a new binary software object by compiling the new IR; and producing a new binary executable software object using the new binary software object. Optimizing the plurality of intermediate computer instructions based on the analysis of the plurality of statistical values increases accuracy of the new IR. Optionally, the at least one management task further comprises providing at least part of the new binary executable software object to the at least one hardware processor for execution instead of at least part of the binary executable software object. Optionally, the at least one management task further comprises configuring at least one processing circuitry, connected to the at least one hardware processor, for executing at least part of the new binary executable software object. Providing at least part of the new binary executable software object for execution instead of at least part of the binary executable software object, and additionally or alternatively configuring at least one processing circuitry for executing at least part of the new binary executable software object increase performance of the system when executing the software program, i.e. reduces latency and additionally or alternatively increases throughput of performing one or more tasks of the software program. Optionally, at least one of the at least one processing circuitry is selected from the group of processing circuitries consisting of: a central processing unit, a multi-core central processing unit (CPU), a data processing unit (DPU), a microcontroller unit (MCU), an accelerated processing unit (ACU), a field-programmable gate array (FPGA), a coarse-grained reconfigurable architecture (CGRA), a neural-network accelerator, an intelligence processing unit (IPU), an application-specific integrated circuit (ASIC), a quantum computer, and an interconnected computing grid, comprising a plurality of reconfigurable logical elements connected by a plurality of configurable data routing junctions. Optionally, the at least one processing circuitry is further configured for: collecting another plurality of statistical values while executing the at least part of the new binary executable software object; and providing the other plurality of statistical values to the at least one hardware processor. Repeating collection of statistical values allows further optimization of another new IR compared to the IR. Optionally, the at least one management task further comprises adding to the new IR one or more new annotation entries, each for one of one or more new IR locations of the new IR. Adding the one or more new annotation entries increases accuracy of an association between the new IR and the new binary executable software object. Optionally, the at least one management task further comprises configuring at least one processing circuitry, connected to the at least one hardware processor, for executing at least part of the binary executable software object, where the at least part of the binary executable software object is identified according to the analysis of the plurality of statistical values and the one or more updated executable internal annotation entries.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which embodiments. Although methods and materials similar or equivalent to those described herein can be used in the practice or testing of embodiments, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments are herein described, by way of example only, with reference to the accompanying drawings. With specific reference now to the drawings in detail, it is stressed that the particulars shown are by way of example and for purposes of illustrative discussion of embodiments. In this regard, the description taken with the drawings makes apparent to those skilled in the art how embodiments may be practiced.

In the drawings.

DESCRIPTION OF SPECIFIC EMBODIMENTS OF THE INVENTION

The following description focuses on optimizing a software program, however the system and methods described below may be applied to other management tasks, for example distributing execution of the software program among a plurality of processing circuitries. Other examples of a management task include performing an analysis of the software program across binary executable boundaries, and modifying an executable object in-place (with optimized code), for example in processor memory and additionally or alternatively in non-volatile digital storage, instead of recompiling a source code to produce a new executable object.

Some methods for optimizing a software program include performing a static analysis of the software program, for example by analyzing the IR of the software program's source code. Some other methods for optimizing the software program include collecting a plurality of statistical values while executing the software program, and optimizing the IR according to the plurality of statistical values. Some examples of a statistical value include, but are not limited to, an outcome of executing a control-flow instruction, a data value of a variable of the software program, a memory access pattern and a memory virtual address translation.

Address resolution is typically done when linking one or more binary software objects to produce a binary executable software object, and additionally or alternatively when loading the executable object into computer memory, for example when the executable object references a library external to the software program.

When using statistical values collected when executing the software program to analyze the IR, there is a need to associate all the plurality of statistical values with corresponding IR entities. For global entities represented in the global IR symbol table this association may be done using the global symbol table of the executable object. However, statistical values collected when executing the software program and pertaining to run-time locations that are not referenced in the global symbol table of the executable object, cannot be matched to a corresponding IR entity using the global IR symbol table.

There exist methods of annotating code to match executable code to source code of a software program, for example debugging information, however such annotation does not match run-time locations in an executable object with corresponding IR entities when the run-time locations are not referenced in the global symbol table of the executable object.

To increase accuracy of an analysis using the plurality of statistical values, there is a need to associate run-time locations that are not referenced in the global symbol table of the executable object with corresponding IR entities.

To do so the present disclosure proposes, in some embodiments described herewithin, to add one or more annotation entries to program data in an IR of the source code of the software program. In such embodiments, each annotation entry of the one or more annotation entries is for one of one or more locations in the IR, and the one or more annotation entries comprise at least one internal annotation entry that is generated for an internal location in the IR that is not referenced by an IR symbol in the global IR symbol table that is propagated to the executable object. Adding one or more internal annotation entries to the program data of the IR allows propagating one or more references to one or more internal locations in the IR to the executable object when the one or more internal locations in the IR are not referenced by the global IR symbol table or are referenced by one or more other IR symbols that are not propagated to the executable object.

Propagating the one or more references to the one or more internal location in the IR to the executable object allows updating, when linking the executable object and additionally or alternatively when loading the executable object, one or more executable internal annotation entries to reference one or more run-time locations each associated with one of the one or more internal locations in the IR. Optionally, the IR is compiled to produce a binary software object that comprises binary program data, where the binary program data comprises the one or more annotation entries, including the at least one internal annotation entry. Optionally, the binary object is provided to a linker to produce a binary executable software object. Optionally, the executable object has one or more executable internal annotation entries generated using the binary object, optionally generated from the binary program data of the binary object. Optionally, the one or more executable internal annotation entries are each for one of the at least one internal annotation entries. Optionally, the one or more executable internal annotation entries are in execution program data of the executable object. Optionally, the one or more executable internal annotation entries are updated by the linker to reference a run-time location in the executable object where the run-time location in the executable object is associated with the internal location in the IR of the at least one internal annotation entry. Optionally, the one or more executable internal annotation entries are updated by a dynamic loader, optionally when loading the executable object. Optionally, compiling the IR, linking the executable object or loading the executable object, or any combination thereof, is achieved using compiling, linking and loading tools as known in the art, allowing performing management tasks, for example optimizing the software program, without further increasing complexity of development of the software program by requiring bespoke compiling, linking and loading tools.

There exist various means by which an internal location in the IR may be identified. Optionally, an internal annotation entry comprises an internal IR symbol that is not in the global IR symbol table. Optionally, an internal annotation entry comprises an identified instruction operation code. Optionally, an internal annotation entry comprises a reference to a program counter.

In addition, in some embodiments described herewithin, the present disclosure proposes providing the IR comprising the one or more annotation entries and the executable object comprising the updated one or more internal annotation entries to one or more management software objects for the purpose of performing one or more management tasks. For example, a management task may be optimizing the IR according to one or more performance objectives. Some examples of a performance objective include reducing latency when providing a service of the software program (reduce latency), increasing an amount of tasks executed in a time internal (increase throughput), and reducing an amount of computing resources used when executing the software program such as CPU utilization and memory accesses. Another example of a management task is distributing one or more services provided by the software program among one or more processing circuitries.

Optionally, in some embodiments described herewithin, the present disclosure proposes collecting a plurality of statistical values while executing at least part of the executable object and further providing the plurality of statistical values to the one or more management software objects. Providing the plurality of statistical values to the one or more management software objects increases accuracy of an outcome of the management task, for example improves optimization of the IR. Optionally, at least some of the plurality of statistical values are collected by a plurality of telemetry intermediate instructions inserted into a plurality of intermediate computer instructions of the IR.

Optionally, the one or more management tasks comprise performing an analysis of the plurality of statistical values. Optionally, the one or more management tasks comprise optimizing the plurality of intermediate computer instructions of the IR based on the analysis of the plurality of statistical values and the one or more updated executable internal annotation entries to produce a new IR of the source code.

In some embodiments the present disclosure proposes producing a new binary object by compiling the new IR and producing a new executable object using the new binary object. Optionally, the present disclosure proposes in some embodiments providing at least part of the new executable object for execution instead of at least part of the executable object. Executing at least part of the new executable object, generated from an optimized IR as described, instead of at least part of the executable object increases performance of a system executing the software program.

When the executable object is executed on at least one hardware processor, in some embodiments the present disclosure proposes configuring one or more processing circuitry, other than the at least one hardware processor and connected to the at least one hardware processor, for executing at least part of the executable object instead of executing the at least part of the executable object by the at least one hardware processor. Optionally, in some embodiments the present discloser proposes configuring the one or more processing circuitry for executing at least part of the new executable object, instead of executing at least part of the executable object on the at least one hardware processor. Executing the at least part of the executable object or at least part of the new executable object on the one or more processing circuitry offloads the at least one hardware processor, i.e. reduces an amount of computing resources required by the at least one hardware processor, improving performance of a system executing the software program.

Before explaining at least one embodiment in detail, it is to be understood that embodiments are not necessarily limited in its application to the details of construction and the arrangement of the components and/or methods set forth in the following description and/or illustrated in the drawings and/or the Examples. Implementations described herein are capable of other embodiments or of being practiced or carried out in various ways.

Embodiments may be a system, a method, and/or a computer program product. The computer program product may include a computer readable storage medium (or media) having computer readable program instructions thereon for causing a processor to carry out aspects of the embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments may be assembler instructions, instruction-set-architecture (ISA) instructions, machine instructions, machine dependent instructions, microcode, firmware instructions, state-setting data, or either source code or object code, natively compiled or compiled just-in-time (JIT), written in any combination of one or more programming languages, including an object oriented programming language such as Smalltalk, C++, Java™, Object-Oriented Fortran or the like, an interpreted programming language such as JavaScript™, Python or the like, and conventional procedural programming languages, such as the "C" programming language, Fortran, or similar programming languages. Oracle®, Java, MySQL, and NetSuite are registered trademarks of Oracle and/or its affiliates. The computer readable program instructions may execute entirely on the user's computer, partly on the user's computer, as a stand-alone software package, partly on the user's computer and partly on a remote computer or entirely on the remote computer or server.

In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), a coarse-grained reconfigurable architecture (CGRA), or programmable logic arrays (PLA) may execute the computer readable program instructions by utilizing state information of the computer readable program instructions to personalize the electronic circuitry, in order to perform aspects of embodiments.

Aspects of embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
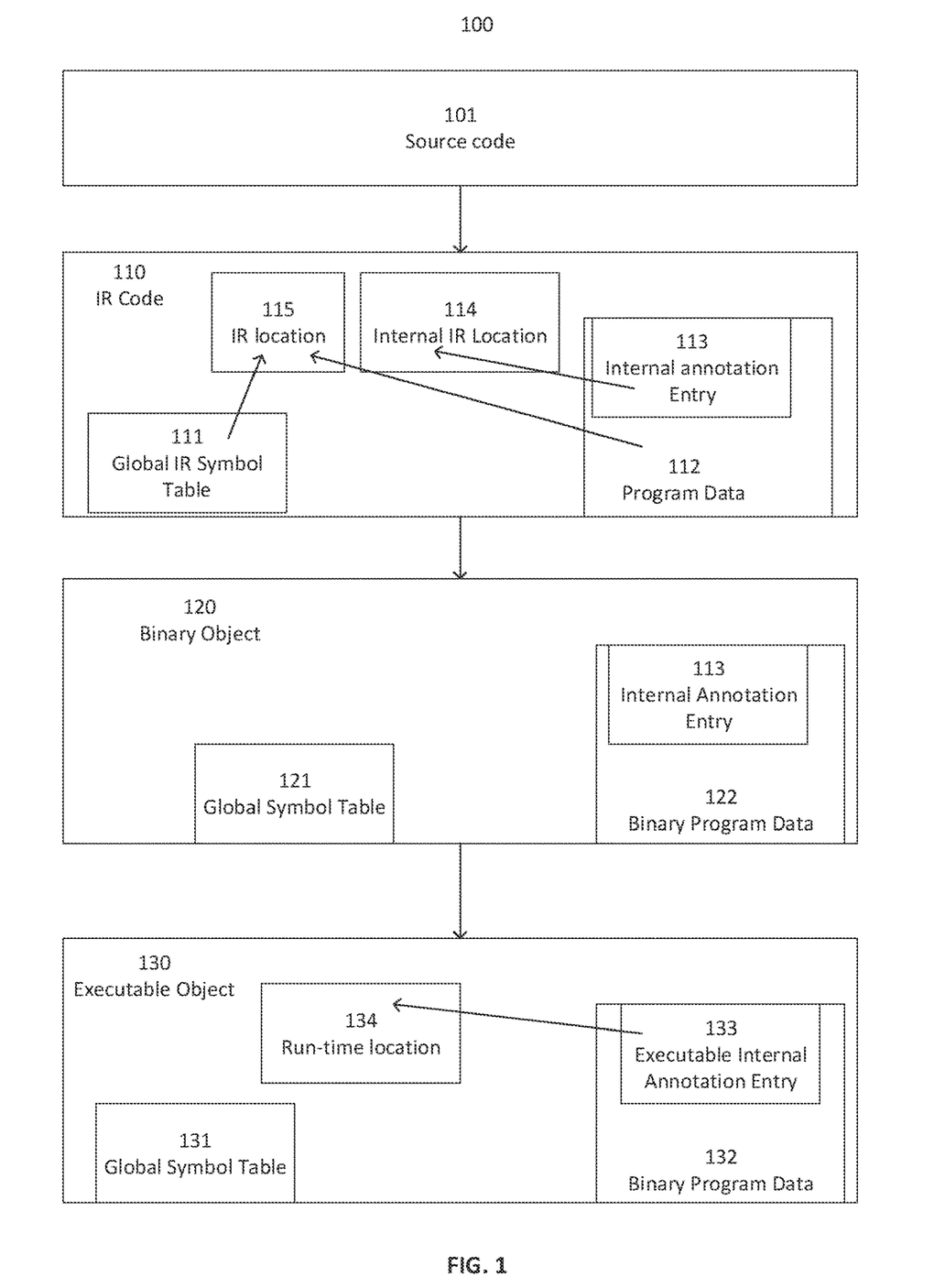
FIG. 1 is a schematic block diagram of exemplary code, according to some embodiments.

Reference is now made to FIG. 1, showing a schematic block diagram of exemplary code 100, according to some embodiments. In such embodiments, IR code 110 is an intermediate representation of source code 101 of a software program. Optionally, IR code 110 is independent of a programming language of source code 101. Optionally, IR code 110 is independent of a target machine language of a target hardware processor for executing the software program. Optionally, IR 110 comprises program data 112. Optionally, IR 110 comprises a global IR symbol table 111, comprising at least some of one or more IR symbols generated when producing IR 110. Optionally, each of the one or more IR symbols generated when producing IR 110 references a location in IR 110 of one or more locations in IR 110.

For brevity, the term "internal IR location" is used henceforth to mean "internal location in the IR" and the terms are used interchangeably.

Optionally, one or more annotation entries are added to program data 112, where each annotation entry thereof is for one of the one or more locations in IR 110. Optionally, the one or more annotation entries comprise one or more internal annotation entries 113, at least one of which is generated for internal IR location 114 such that the global IR symbol table 111 does not reference internal IR location 114. Optionally, internal IR location 114 is a location of an IR entity of a plurality of IR entities of IR 110. Some examples of an IR entity include a function identifier, a variable identifier, a label identifier, a function argument identifier, and an instruction identifier. Optionally, the IR entity is an internal IR symbol of one or more IR symbols that are not in the global IR symbol table 111, for example a function identifier not in global IR symbol table 111.

A function identifier may identify a function in IR 110. Optionally, a function identifies a function external to IR 110. Similarly, a label identifier may be intra-module, identifying a location in IR 110, or inter-module, identifying a location external to IR 110. When IR 110 comprises a plurality of intermediate computer instructions, an instruction identifier optionally identifies one of the plurality of intermediate computer instructions.

Optionally, IR 110 comprises a plurality of basic-blocks, where each of the plurality of basic-blocks is associated with one of a plurality of execution blocks of the software program. Optionally, internal IR location 114 identifies one of the plurality of basic-blocks. When internal IR location 114 is a label identifier, internal IR location 114 optionally identifies the basic-block of the plurality of basic-blocks.

Optionally, each of the one or more internal annotation entries 113 comprises a reference value identifying internal IR location 114. Optionally, for at least one of the one or more internal annotation entries 113 the reference value is an internal IR symbol of the one or more IR symbols that are not in global IR symbol table 111, where the internal IR symbol identifies internal IR location 114, for example a function identifier not in global IR symbol table 111.

Optionally, the reference value is an identified instruction operation opcode, for example when internal IR location 114 is a location of one of the plurality of intermediate computer instructions of IR 110 comprising the identified instruction operation opcode. Optionally, the reference value is an identified value in an instruction, for example when internal IR location 114 is a location of another of the plurality of intermediate computer instructions having a function argument equivalent to the identified value, according to an equivalence test. Optionally, the reference value is a reference to a program counter.

When compiling source code 101 comprises a plurality of compiler passes, adding the one or more annotation entries to program data 112 may be done in one of the plurality of compiler passes.

Optionally, binary software object 120 is a binary object generated from IR 110. Optionally, binary object 120 comprises binary program data 122, optionally generated using program data 112. Optionally, binary program data 122 comprises the one or more annotation entries added to IR 110, optionally comprising one or more internal annotation entries 113. Optionally, binary object 120 comprises a global symbol table 121, optionally generated using global IR symbol table 111.

Optionally, binary executable software object 130 is generated using binary object 120. For example, executable object 130 may be generated by linking binary object 120, optionally with one or more other binary objects. Executable object 130 may be an executable program. Optionally, executable object 130 is a static library. Optionally, executable object is a DLL.

Optionally, executable object 130 comprises global symbol table 131, optionally generated using global symbol table 121 of binary object 120. Optionally, executable object 130 comprises binary program data 132, optionally generated using binary program data 122 of binary object 120. Optionally, binary program data 132 comprises one or more executable internal annotation entries 133. Optionally, each of the one or more executable internal annotation entries 133 is generated for one of the one or more internal annotation entries 113.

Optionally, executable object 130 comprises a run-time location 134 associated with internal IR location 114, where internal IR location 114 is referenced by one or more internal annotation entries 113. Optionally, executable internal annotation entry 133, generated for one or more internal annotation entries 113, is updated to reference run-time location 134. Optionally, executable internal annotation entry 133 is updated when linking binary object 120 to generate executable 130, for example when internal IR location 114 is a location in IR 110 or when run-time location 134 is in executable object 130. Optionally, executable internal annotation entry 133 is updated when loading executable object for execution, for example by a dynamic loader of an operating system, for example when executing the software program comprises dynamically loading another executable object, external to executable object 130, for example another DLL.

As described above, one or more internal annotation entries 113 comprise a reference value that identifies internal IR location 114. As each of the one or more executable internal annotation entries 133 is generated for one of the one or more internal annotation entries 113, the respective reference value that identifies internal IR location 114 allows matching run-time location 134 in updated executable internal annotation entry 133 with internal location IR 114.

Figure 2:
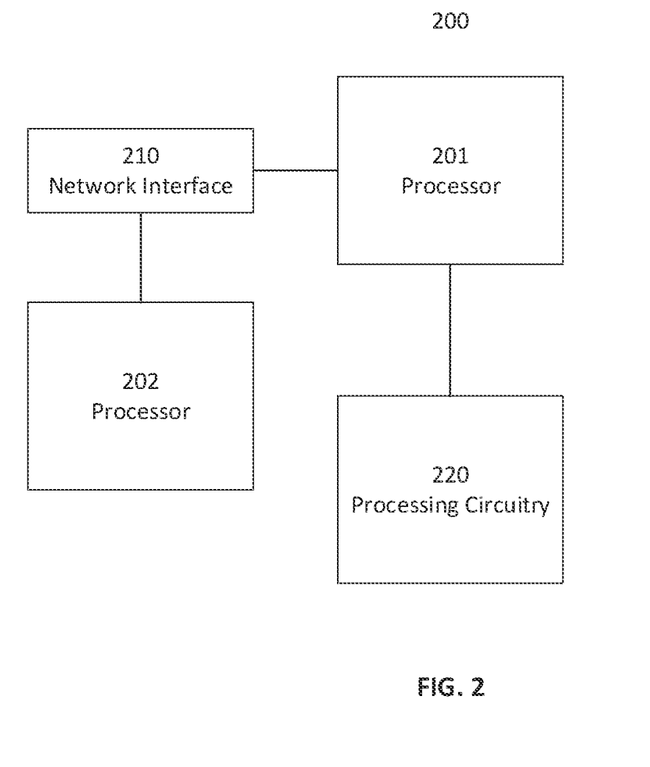
FIG. 2 is a schematic block diagram of an exemplary system, according to some embodiments.

Reference is now made also to FIG. 2, showing a schematic block diagram of an exemplary system 200, according to some embodiments. In such embodiments, at least one hardware processor 201 is connected to one or more other processing circuitry 220.

For brevity, hence forth the term "processing unit" is used to mean "at least one hardware processor" and the terms are used interchangeably. Optionally, processing unit 201 is connected to another processing unit 202, optionally via one or more digital communication network interface 210 connected to processing unit 201.

Optionally, one or more other processing circuitry 220 is a central processing unit. Optionally, one or more other processing circuitry 220 is an interconnected computing grid, comprising a plurality of reconfigurable logical elements connected by a plurality of configurable data routing junctions. Some other examples of another processing circuitry include: a data processing unit (DPU), a microcontroller unit (MCU), an accelerated processing unit (ACU), a field-programmable gate array (FPGA), a coarse-grained reconfigurable architecture (CGRA), a neural-network accelerator, an intelligence processing unit (IPU), an application-specific integrated circuit (ASIC), and a quantum computer.

To generate executable code, for example executable object 130, in some embodiments system 200 implements the following optional method.

Figure 3:
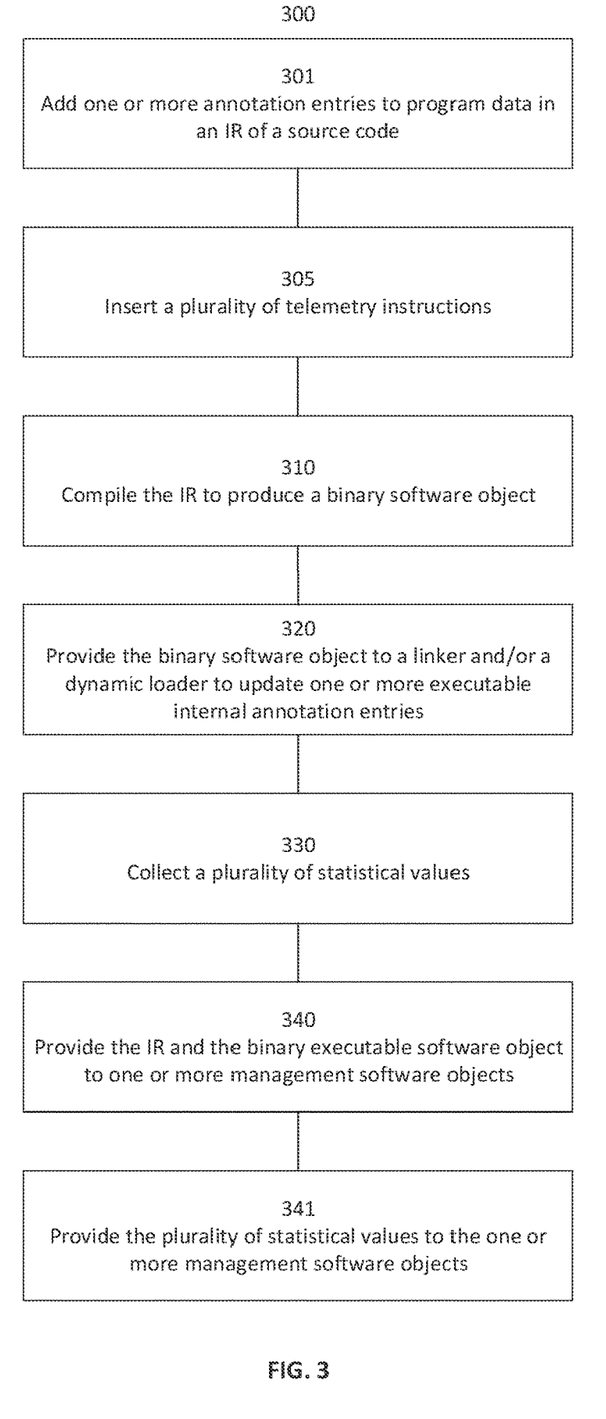
FIG. 3 is a flowchart schematically representing an optional flow of operations for generating executable code, according to some embodiments.

Reference is now made also to FIG. 3, showing a flowchart schematically representing an optional flow of operations 300 for generating executable code, according to some embodiments. In such embodiments, in 301 processing unit 201 adds one or more internal annotation entries 113 to program data 112 of IR 110. In 310, processing unit 201 optionally compiles IR 110 to produce binary software object 120. Optionally, binary object 120 comprises binary program data 122, where binary program data 122 comprises one or more internal annotation entries 113. When compiling binary object 120 comprises a plurality of compiler passes, processing unit 201 optionally executes 301 in one of the plurality of compiler passes.

Optionally, processing unit 201 generates executable object 130 using binary object 120, optionally by providing binary object 120 to a linker Optionally, generating executable object 130 generates one or more executable internal annotation entries 133 in executable object 130, where each of one or more executable internal annotation entries 133 is generated for one of one or more internal annotation entries 113. Optionally, in 320 processing unit 201 provides binary object 120 to a linker to update one or more executable internal annotation entries 133 to reference run-time location 134 that is associated with internal IR location 114. Optionally, processing unit 201 updates one or more executable internal annotation entries 133 when linking binary object 120 to produce executable object 130, for example for an intra-module reference where run-time location 134 is a location in a plurality of machine code instructions of executable object 130.

Optionally, in 320 processing unit 201 provides binary object 120 and additionally or alternatively executable object 130 to a dynamic loader to update the one or more executable internal annotation entries 133 to reference run-time location 134, optionally when the dynamic loader configures processing unit 201 to execute executable object 130, for example for an inter-module reference where run-time location 134 is external to executable object 130. Optionally, the dynamic loader is executed by processing unit 201. Optionally, the dynamic loader is executed by other processing unit 202 such that in 320 processing unit 201 provides executable object 130 to other processing unit 202. Optionally, the one or more executable internal annotation entries 133 are updated in executable object 130 when the dynamic loader configures other processing unit 202 to execute executable object 130.

The executable object 130 comprising the updated one or more executable internal annotation entries 133 may be used when performing one or more management tasks, for example when optimizing the software program. Optionally, in 340 processing unit 201 provides IR 110 comprising the one or more annotation entries and executable object 130 comprising the updated one or more executable internal annotation entries 133 to one or more management software objects for the purpose of performing one or more management tasks, for example for the purpose of analysis. Optionally, processing unit 201 executes the one or more management software objects. Optionally, other processing unit 201 executes the one or more management tasks.

Optionally, a plurality of statistical values is used when performing the one or more management tasks. Optionally, in 330 processing unit 201 collects the plurality of statistical values while executing at least part of executable object 130. Optionally, the at least part of executable object 130 is executed by processing unit 201. Optionally, the at least part of executable object 130 is executed by other processing unit 202. Other processing unit 202 collects the plurality of statistical values while executing the at least part of executable object 130. Optionally, one or more processing circuitry 220 is configured for executing the at least part of executable object 130. Optionally, one or more processing circuitry 220 collects the plurality of statistical values while executing the at least part of executable object 130. Optionally, in 341 processing unit 201 provides the plurality of statistical values to the one or more management software objects, further to providing thereto IR 110 comprising the one or more annotation entries and executable object 130 comprising the updated one or more executable internal annotation entries 133.

A statistical value may be indicative of an outcome of executing a control-flow instruction, for example a conditional branch instruction. Other possible examples of a statistical value include, but are not limited to, a data value of a variable of the software program, a memory access pattern, and a memory virtual address translation.

Optionally, IR 110 comprises a plurality of intermediate computer instructions. For the purpose of collecting the plurality of statistical values, in 305 processing unit 201 optionally inserts a plurality of telemetry instructions into the plurality of intermediate computer instructions.

Figure 4:
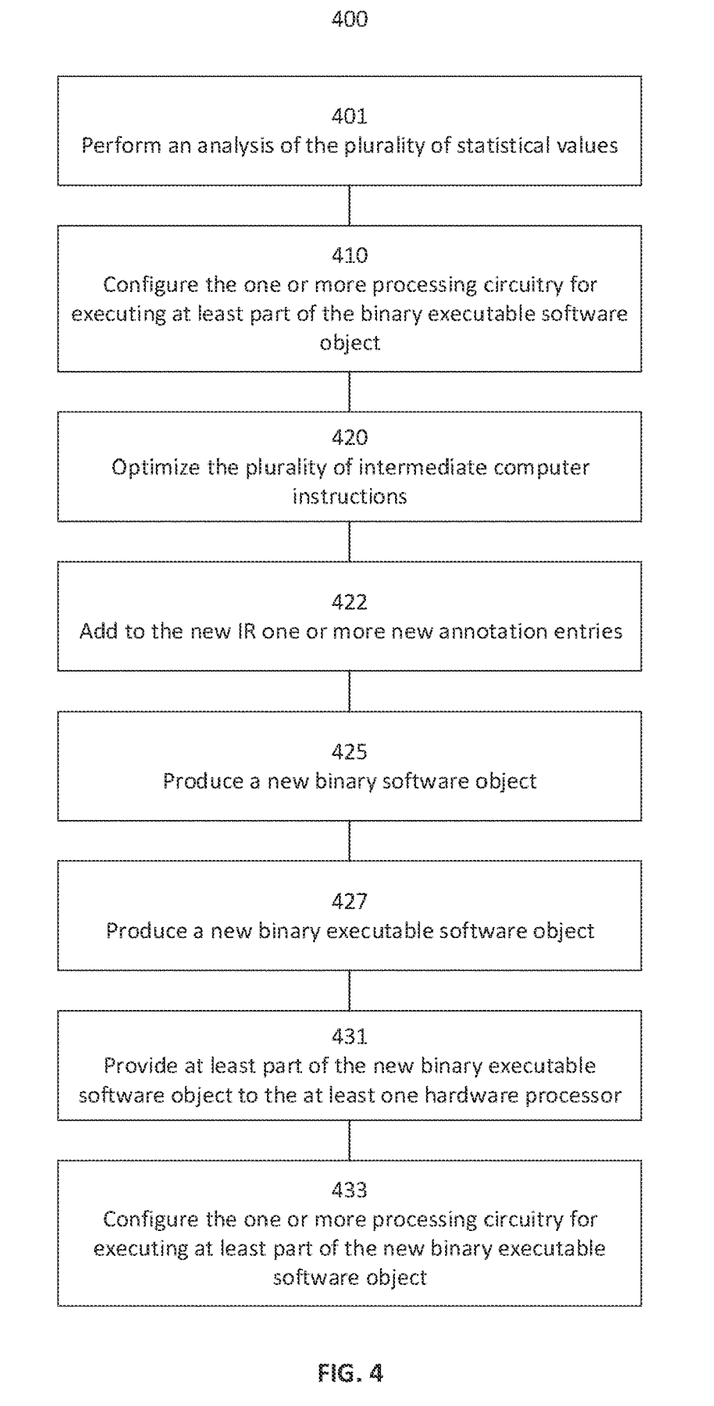
FIG. 4 is a flowchart schematically representing an optional flow of operations for a management task, according to some embodiments.

Reference is now made also to FIG. 4, showing a flowchart schematically representing an optional flow of operations 400 for a management task, according to some embodiments. The following description focuses on some embodiments where the one or more management software objects are executed by processing circuitry 201, however in some other embodiments 400 may be executed by other processing unit 202.

Optionally, in 401 processing unit 201 performs an analysis of the plurality of statistical values. Optionally, in 410 processing unit 201 configures one or more processing circuitry 210 for executing at least part of executable object 130. Optionally, the at least part of executable object 130 is identified according to the analysis in 401.

In 420, processing unit 201 optionally optimizes the plurality of intermediate computer instructions based on the analysis in 401, and the one or more updated executable internal annotation entries 133. Using the one or more updated executable internal annotation entries 133 allows matching at least some of the statistical values with internal IR location 114. Optionally, processing unit 201 optimizes the plurality of intermediate computer instructions to produce a new IR of source code 101 comprising a new plurality of intermediate computer instructions.

Optionally, in 422 processing unit 201 adds to the new IR one or more new annotation entries, each for one of one or more new IR locations of the new IR. For example, a new annotation entry may be for a new IR symbol in the new IR and not in IR 110. In another example, a new annotation entry may be for a new intermediate computer instruction added in the new IR.

In 425, processing unit 201 optionally produces a new binary object by compiling the new IR and in 427 processing unit 201 optionally produces a new executable object using the new binary object. Optionally, to produce the new plurality of intermediate computer instructions processing unit 201 replaces at least part of the plurality of intermediate computer instructions. Optionally, at least some of the new plurality of intermediate computer instructions are some of the plurality of intermediate computer instructions.

In 431, processing unit 201 optionally provides at least part of the new executable object for execution instead of at least part of executable object 130, optionally by processing unit 201, optionally by other processing unit 202.

Optionally, in 433 processing unit 201 configures one or more processing circuitry 210 to execute the at least part of the new executable object. Optionally, one or more processing circuitry 210 collect another plurality of statistical values while executing the at least part of the new executable object. Optionally, one or more processing circuitry 210 provide the other plurality of statistical values to processing circuitry 201.

Optionally, method 400 is repeated in a plurality of optimization iterations.

In some embodiments, system 200 executes a software program. Optionally, processing unit 201 accesses executable object 130 that was generated using method 400. Optionally, processing unit 201 executes executable object 130.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant intermediate representations and annotation entries will be developed and the scope of the terms "intermediate representation" and "annotation entry" is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment may include a plurality of "optional" features unless such features conflict.

Throughout this application, various embodiments may be presented in a range format. It should be understood that the description in range format is merely for convenience and brevity and should not be construed as an inflexible limitation on the scope of embodiments. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of embodiments, which are, for clarity, described in the context of separate embodiments, may also be provided in combination in a single embodiment. Conversely, various features of embodiments, which are, for brevity, described in the context of a single embodiment, may also be provided separately or in any suitable subcombination or as suitable in any other described embodiment. Certain features described in the context of various embodiments are not to be considered essential features of those embodiments, unless the embodiment is inoperative without those elements.

Although embodiments have been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A system for generating executable code, comprising at least one hardware processor adapted for:
   to program data in an intermediate representation (IR) of a source code of a software program, the IR representing the source code independent of at least one of a source programming language and a target machine language, and
   comprising a global IR symbol table comprising at least some of one or more IR symbols generated when producing the IR, each IR symbol referencing a location in the IR, adding one or more annotation entries, each for one of one or more locations in the IR,
   wherein at least one internal annotation entry of the one or more annotation entries is generated for an internal location in the IR that is not referenced by an IR symbol in the global IR symbol table;
   compiling the IR to produce a binary software object comprising binary program data, where the binary program data comprises the one or more annotation entries;
      updating one or more executable internal annotation entries in a binary executable software object generated using the binary software object, each generated for one of the at least one internal annotation entries, to reference a run-time location in the binary executable software object where the run-time location is associated with the internal location in the IR of the at least one internal annotation entry, by providing the binary software object to at least one of a linker and a dynamic loader; and
   providing the IR comprising the one or more annotation entries and the binary executable software object comprising the updated one or more executable internal annotation entries to at least one management software object to distribute one or more services provided by the software program among one or more processing circuitries;
   wherein at least one of the one or more executable internal annotation entries is updated in the binary executable software object when linking the binary software object to produce the binary executable software object or when loading the binary executable software object for execution by the dynamic loader.

2. The system of claim 1, wherein the internal location in the IR is a location in the IR of an IR entity selected from the group of IR entities consisting of: a function identifier, a variable identifier, a function argument identifier, an instruction identifier, and a label identifier.

3. The system of claim 2, wherein the IR further comprises a plurality of basic-blocks, each associated with one of a plurality of execution blocks of the software program; and
   wherein the label identifier identifies one of the plurality of basic-blocks.

4. The system of claim 1, wherein at least one of the at least one internal annotation entries comprises at least one of: an internal IR symbol of the one or more IR symbols that is not in the global IR symbol table, an identified instruction operation code, an identified value in an instruction, and a reference to a program counter.

5. The system of claim 1, wherein the at least one hardware processor is further configured for providing the binary executable software object to at least one other hardware processor executing the dynamic loader; and
   wherein at least one of the one or more executable internal annotation entries is updated in the binary executable software object when the dynamic loader configures the at least one other hardware processor to execute the binary executable software object.

6. The system of claim 5, wherein the at least one other hardware processor is the at least one hardware processor.

7. The system of claim 1, wherein the at least one hardware processor is further adapted for:
   collecting a plurality of statistical values while executing at least part of the binary executable software object; and
   further providing the plurality of statistical values to the at least one management software object.

8. The system of claim 7, wherein at least one of the plurality of statistical values is indicative of one of: an outcome of executing a control-flow instruction, a data value of a variable of the software program, a memory access pattern, and a memory virtual address translation.

9. The system of claim 7, wherein the at least one hardware processor is further adapted for inserting a plurality of telemetry intermediate computer instructions into the plurality of intermediate computer instructions, for the purpose of collecting the plurality of statistical values.

10. The system of claim 7, wherein the at least one hardware processor is further adapted for providing the plurality of statistical values, the IR comprising the one or more annotation entries and the binary executable software object comprising the updated one or more internal annotation entries to the at least one management software object for the purpose of further performing at least one management task.

11. The system of claim 10, wherein the at least one management task comprises performing an analysis of the plurality of statistical values.

12. The system of claim 11, wherein the at least one management task further comprises configuring at least one processing circuitry, connected to the at least one hardware processor, for executing at least part of the binary executable software object, where the at least part of the binary executable software object is identified according to the analysis of the plurality of statistical values and the one or more updated executable internal annotation entries.

13. The system of claim 10, wherein the at least one management task further comprises optimizing a plurality of intermediate computer instructions of the IR based on an association between at least some of the plurality of statistical values and the internal location in the IR, to produce a new IR of the source code, comprising a new plurality of intermediate computer instructions;
   producing a new binary software object by compiling the new IR; and
   producing a new binary executable software object using the new binary software object.

14. The system of claim 13, wherein the at least one management task further comprises providing at least part of the new binary executable software object to the at least one hardware processor for execution instead of at least part of the binary executable software object.

15. The system of claim 13, wherein the at least one management task further comprises configuring at least one processing circuitry, connected to the at least one hardware processor, for executing at least part of the new binary executable software object.

16. The system of claim 15, wherein at least one of the at least one processing circuitry is selected from the group of processing circuitries consisting of: a central processing unit, a multi-core central processing unit (CPU), a data processing unit (DPU), a microcontroller unit (MCU), an accelerated processing unit (ACU), a field-programmable gate array (FPGA), a coarse-grained reconfigurable architecture (CGRA), a neural-network accelerator, an intelligence processing unit (IPU), an application-specific integrated circuit (ASIC), a quantum computer, and an interconnected computing grid, comprising a plurality of reconfigurable logical elements connected by a plurality of configurable data routing junctions.

17. The system of claim 15, wherein the at least one processing circuitry is further configured for:
   collecting another plurality of statistical values while executing the at least part of the new binary executable software object; and
   providing the other plurality of statistical values to the at least one hardware processor.

18. The system of claim 13, wherein the at least one management task further comprises adding to the new IR one or more new annotation entries, each for one of one or more new IR locations of the new IR.

19. The system of claim 7, wherein the at least some of the plurality of statistical values and the internal location in the IR are associated using the binary executable software object comprising the updated one or more executable internal annotation entries.

20. A method for generating executable code, comprising:
   to program data in an intermediate representation (IR) of a source code of a software program, the IR representing the source code independent of at least one of a source programming language and a target machine language, and
   comprising a global IR symbol table comprising at least some of one or more IR symbols generated when producing the IR, each IR symbol referencing a location in the IR, adding one or more annotation entries, each for one of one or more locations in the IR, wherein at least one internal annotation entry of the one or more annotation entries is generated for an internal location in the IR that is not referenced by an IR symbol in the global IR symbol table;
   compiling the IR to produce a binary software object comprising binary program data, where the binary program data comprises the one or more annotation entries;
   updating one or more executable internal annotation entries in a binary executable software object generated using the binary software object, each generated for one of the at least one internal annotation entries, to reference a run-time location in the binary executable software object where the run-time location is associated with the internal location in the IR of the at least one internal annotation entry, by providing the binary software object to at least one of a linker and a dynamic loader;
   collecting a plurality of statistical values while executing at least part of the binary executable software object; and providing the IR comprising the one or more annotation entries and the binary executable software object comprising the updated one or more executable internal annotation entries to at least one management software object to distribute one or more services provided by the software program among one or more processing circuitries;

wherein at least one of the one or more executable internal annotation entries is updated in the binary executable software object when linking the binary software object to produce the binary executable software object or when loading the binary executable software object for execution by the dynamic loader.

21. A system for executing a software program, comprising at least one hardware processor adapted for:

accessing a binary executable software object produced by:

to program data in an intermediate representation (IR) of a source code of a software program, the IR representing the source code independent of at least one of a source programming language and a target machine language and comprising a global IR symbol table comprising at least some of one or more IR symbols generated when producing the IR, each IR symbol referencing a location in the IR, adding one or more annotation entries, each for one of one or more locations in the IR, wherein at least one internal annotation entry of the one or more annotation entries is generated for an internal location in the IR that is not referenced by an IR symbol in the global IR symbol table;

compiling the IR to produce a binary software object comprising binary program data, where the binary program data comprises the one or more annotation entries;

updating one or more executable internal annotation entries in a binary executable software object generated using the binary software object, each generated for one of the at least one internal annotation entries, to reference a run-time location in the binary executable software object where the run-time location is associated with the internal location in the IR of the at least one internal annotation entry, by providing the binary software object to at least one of a linker and a dynamic loader;

executing at least part of the binary executable software object;

collecting a plurality of statistical values while executing the at least part of the binary executable software object; and providing the IR comprising the one or more annotation entries and the binary executable software object comprising the updated one or more executable internal annotation entries to at least one management software object to distribute one or more services provided by the software program among one or more processing circuitries;

wherein at least one of the one or more executable internal annotation entries is updated in the binary executable software object when linking the binary software object to produce the binary executable software object or when loading the binary executable software object for execution by the dynamic loader.

\* \* \* \* \*